United States Patent [19]
Aoki et al.

[11] Patent Number: 5,999,364
[45] Date of Patent: Dec. 7, 1999

[54] CASSETTE MOUNTING AND EJECTION MECHANISM

[75] Inventors: Osamu Aoki; Fumio Sekiguchi, both of Kanagawa, Japan

[73] Assignee: Sony Corporation, Tokyo, Japan

[21] Appl. No.: 08/768,803

[22] Filed: Dec. 18, 1996

[30] Foreign Application Priority Data

Dec. 26, 1995 [JP] Japan .................................... 7-350744
Sep. 26, 1996 [JP] Japan .................................... 8-273919

[51] Int. Cl.⁶ .................................................. G11B 5/008
[52] U.S. Cl. ........................................................ 360/96.6
[58] Field of Search .............................. 312/330.1, 9.16, 312/9.25, 9.42, 334.3; 360/85, 96.5, 96.6

[56] References Cited

U.S. PATENT DOCUMENTS

| | | | |
|---|---|---|---|
| 4,811,138 | 3/1989 | Park | 360/96.6 X |
| 5,068,758 | 11/1991 | Choi | 360/96.6 |
| 5,523,907 | 6/1996 | Seo et al. | 360/96.5 |

FOREIGN PATENT DOCUMENTS

| | | | |
|---|---|---|---|
| 1233160 | 1/1967 | Germany | 360/96.6 |
| 4318368 | 11/1992 | Japan | 360/96.6 |
| 6131771 | 5/1994 | Japan | 360/96.6 |
| 6231521 | 8/1994 | Japan | 360/96.6 |

*Primary Examiner*—Peter M. Cuomo
*Assistant Examiner*—James O. Hansen
*Attorney, Agent, or Firm*—Frommer Lawrence & Haug, LLP; William S. Frommer

[57] ABSTRACT

In a pop-up type cassette mounting and ejection mechanism having a lid member which closes a cassette inserting/taking-out opening of a housing when a cassette holder is located at a cassette mount position, and also is movable away from the housing interlockingly with the movement of the cassette holder to a cassette eject position to open the cassette inserting/taking-out opening, the lid member is mounted on the cassette holder so as to be slidable in a direction parallel to the insertion direction of the cassette into the cassette holder, and one of the two side edges of a reinforcing member of a plate member is rotatably mounted on the lid member while the other side edge is rotatably mounted on the housing, thereby linking the housing and the lid member through the reinforcing member. Further, at the cassette inserting/taking-out opening side of the cassette holder, the recess is formed in the housing and the projection for closing the recess is formed in the lid member. Therefore, the insertion of the fingers into the cassette holder from the cassette inserting/taking-out opening can be further facilitated in combination with the displacement of the lid member from the cassette inserting/taking-out opening in the cassette insertion direction when the cassette holder is pushed out to the cassette eject position out of the housing.

8 Claims, 12 Drawing Sheets

CASSETTE MOUNTING AND EJECTION MECHANISM

BACKGROUND OF THE INVENTION

1. Field of the Invention

The present invention relates to a so-called pop-up type cassette mounting and ejection mechanism, and more particularly to a cassette mounting and ejection mechanism which is suitably applicable to a video tape recorder, etc.

2. Description of Related Art

A pop-up type cassette mounting and ejection mechanism is used in, for example, a video camera with a video tape recorder (so-called a camcorder).

The applicant has previously proposed a pop-up type cassette mounting and ejection mechanism as disclosed in Japanese Laid-open Utility Model Application No. Hei-1-165938 (Utility Model Application No. Sho-63-61995). In this pop-up type cassette mounting and ejection mechanism, a lid plate (or lid member) is movably provided with respect to the cassette holder with the lid member being shifted in linking with the movement of the cassette holder. In this construction, when the cassette holder is moved to a cassette inserting/taking-out position, the lid member is shifted in a direction of cassette insertion to thereby facilitate the inserting/taking-out of the cassette into/from the cassette holder.

Further, the applicant also proposed another cassette mounting and ejection mechanism as disclosed in Japanese Laid-open Utility Model Application NO. Hei-4-81234 (Utility Model Application No. Hei-2-124742). In this mechanism, a lid member for opening and closing a cassette inserting/taking-out port of the cassette holder is equipped with a slider which is forwardly/backwardly movable (i.e., retractable). A connecting link for driving the slider is pivotally mounted on the slider and one swing link of each pair of swing links to move the slider forwardly/backwardly while following the retractable motion of the cassette holder. With this construction, the inserting/taking-out operation of large or small size cassettes can be facilitated, and the opening/closing operation of the lid member can be smoothly performed.

FIGS. 1 to 3 are diagrams showing a conventional pop-up type cassette mounting and ejection mechanism a.

The cassette mounting and ejection mechanism a shown in FIGS. 1 to 3 is used for a video camera d in which two kinds of cassettes b and c having different size are usable, i.e., a so-called compatible type video cassette apparatus.

The cassette mounting and ejection mechanism a includes a cassette holder g which is movable between a cassette mount position in a housing e of the video camera d and an eject position out of the housing e through a cassette inserting/taking-out opening f which is formed on the side surface of the housing e of the video camera d, pantograph type link mechanisms k and k' through which the cassette holder g is supported by a mechanical chassis h which is provided in the housing e, and a lid member j for closing the cassette inserting/taking-out opening f with the cassette holder g being located at the cassette mount position.

The link mechanisms k and k' are disposed along both the side surfaces of the cassette holder g in the direction of cassette width. Therefore, the cassette inserting/taking-out opening f of the housing e is designed to be sufficiently larger than the cassette holder g so that the link mechanisms k and k' do not interfere with the inserting/taking-out motion.

Each of the link mechanisms k and k' is provided with a resilient member (not shown) so as to be urged toward the eject position at all times. Further, when the cassette holder g is located at a cassette mount position, the location of the cassette holder g is held by a lock means not shown.

A lid member j is designed to have substantially the same size as the cassette inserting/taking-out opening f or a slightly larger size than the cassette inserting/taking-out opening f, and it is provided on the outer surface of the cassette holder g. When the cassette holder g arrives at the cassette mount position, the lid member j closes the cassette inserting/taking-out opening f.

According to the cassette mounting and ejection mechanism as described above, when a cassette is mounted on the video camera d, the cassette holder g is drawn out to the eject position, and the cassette is inserted into the cassette holder g. Subsequently, the cassette holder g is manually pushed back into the housing e, and moved back to the cassette mount position.

On the other hand, when the cassette is taken out from the video camera d, the lock means is released by manipulating an eject button so that the cassette holder g is ejected toward the side surface of the housing e by the resilient force of the resilient member, whereby the cassette holder g is moved to the eject position.

In the pop-up type cassette mounting and ejection mechanism a as described above, the cassette holder g is merely supported through the link mechanisms k and k' by the mechanical chassis in the housing e. Therefore, if strong external force is applied to the cassette holder g in a direction different from the mounting direction of the cassette when the cassette holder g is located at the eject position, particularly if the external force is applied in a direction perpendicular to the mounting or ejecting direction (in a direction as indicated by an arrow X in FIG. 1), the cassette holder g, the link mechanisms k and k', the mechanical chassis h, etc. may be deformed or damaged.

Further, the lid member j for closing the cassette inserting/taking-out opening f is designed to be slid in the same direction as the cassette inserting direction along the cassette holder g when the lid member j is moved to the eject position. This design is adopted to prevent the fingers from abutting against the lid member j when a smaller cassette c is deeply inserted into the cassette holder g or taken out from the cassette holder g. In order to move the cassette holder g to the cassette mount position after the smaller cassette c is deeply inserted into the cassette holder g, the lid member is manually pushed inwardly. In this case, if the external force is applied in a direction as indicated by an arrow Y of FIG. 3 with the lid member j being slid, the load is particularly large, and not only the cassette holder g, the link mechanisms k, k' and the mechanical chassis h, but also the lid member itself is liable to be deformed or damaged.

That is, according to the cassette mounting and ejection mechanism a as described above, the cassette holder g is manually pushed into the housing e to move the cassette holder g to the cassette mount position. At this time, if the pushing direction is deviated from the original direction or when the cassette holder g or the lid member j abuts against something in an eject state, some strong external force may be applied to the cassette holder g, resulting in the deformation or damage of the cassette holder g, the link mechanisms k, k', the mechanical chassis h, the lid member j, etc.

Further, when the larger cassette b is pulled out from the cassette holder g, the upper portion of the cassette b which is exposed at the upper end of the cassette holder g is grasped by fingers from the A, A' direction. When the cassette b is inserted, it is also grasped by the fingers from the A,A' direction, and then inserted from the upper end of the cassette holder g. However, when the hand is small or the hand is not sufficiently expandable, it is difficult to grasp the cassette b from the A,A' direction. In order to solve this problem, a gap through which the fingers can be sufficiently inserted may be provided between the cassette holder g and the housing e at the eject position so that the cassette can be grasped from the B,B' direction by the fingers. In this structure, the cassette can be grasped from the B,B' direction by the fingers. However, the large gap may cause erroneous insertion of the cassette or contamination of undesired materials. In addition, dirt such as dust or the like easily invades in the chassis to induce a problem from a view point of being dust-tight.

SUMMARY OF THE INVENTION

An object of the present invention is to provide a pop-up type cassette mounting and ejection mechanism which has enhanced mechanical strength even when a cassette holder is located at an eject position.

Another object of the present invention is to provide a pop-up type cassette mounting and ejection mechanism in which an opening of a housing for inserting/taking-out a cassette therethrough is designed to be small and the mounting and ejecting of the cassette can be facilitated.

In order to attain the above objects, according to a first aspect of the present invention, a cassette mounting and ejection mechanism comprising a housing which has a cassette inserting/taking-out opening, a cassette holder which supports a cassette and is movable through the cassette inserting/taking-out opening between a cassette mount position in the housing and a cassette eject position out of the housing, and a lid member which closes the cassette inserting/taking-out opening of the housing when the cassette holder is located at the cassette mount position and is moved away from the housing interlockingly with the movement of the cassette holder to the cassette eject position to thereby open the cassette inserting/taking-out opening, is made to comprise a reinforcing member which is adapted to link the housing and the lid member with one end thereof being mounted on the housing and the other end thereof being mounted on the lid member.

In the cassette mounting and ejection mechanism as described above, the reinforcing member comprises a plate-shaped member with one side edge thereof being rotatably mounted on the lid member while the other side edge confronting the one side edge being rotatably mounted on the housing.

In the cassette mounting and ejection mechanism as described above, the housing has a recess for accommodating the reinforcing member when the cassette holder is located at the cassette mount position.

In the cassette mounting and ejection mechanism as described above, the reinforcing member is overlapped with the lid member to form the same outer surface when the cassette holder is located at the cassette mount position.

The cassette mounting and ejection mechanism as described above further comprises an auxiliary arm linking the lid member and the housing with one end thereof being rotatably mounted on the housing and the other end thereof being rotatably mounted on the lid member, wherein the lid member is slidably supported by the cassette holder, and the auxiliary arm is rotated for carrying out the sliding motion of the lid member to the cassette holder interlockingly with the movement of the cassette holder between the cassette mount position and the cassette eject position.

In the cassette mounting and ejection mechanism as described above, the auxiliary arm is actuated so that the sliding direction of the lid member is substantially parallel to a direction to which the cassette is inserted into the cassette holder.

In the cassette mounting and ejection mechanism as described above, the auxiliary arm is provided at each of both sides of the cassette holder.

In the cassette mounting and ejection mechanism as described above, the reinforcing member comprises a plurality of arm members which are disposed away from one another in the right and left direction with one end of each arm member being rotatably mounted on the lid member and the other end thereof being rotatably mounted on the housing.

According to a second aspect of the present invention, a cassette mounting and ejection mechanism comprising a housing which has a cassette inserting/taking-out opening, a cassette holder which supports a cassette and is movable through the cassette inserting/taking-out opening between a cassette mount position in the housing and a cassette eject position out of the housing, and a lid member which closes the cassette inserting/taking-out opening of the housing when the cassette holder is located at the cassette mount position and is moved away from the housing interlockingly with the movement of the cassette holder to the cassette eject position to thereby open the cassette inserting/taking-out opening, is made to comprise a recess formed at the cassette insertion port side of the cassette holder, and a projection which is formed at the cassette insertion port side of the cassette holder and is adapted to open/close the recess.

In the cassette mounting and ejection mechanism as described above, the recess is formed in the cassette holder so that the side surfaces of the cassette in the cassette holder appearing at the outside of the cassette holder can be gripped by fingers when the cassette holder is located at the cassette ejection position.

In the cassette mounting and ejection mechanism as described above, the recess is formed in the housing so as to enable smooth insertion of fingers into the housing through a gap formed by the recess when the cassette holder is located at the eject position.

In the cassette mounting and ejection mechanism as described above, the recess comprises a first recess which is formed in the cassette holder so that a part of the side surfaces of the cassette in the cassette holder appear at the outside of the cassette holder when the cassette holder is located at the cassette eject position for enabling a part of the side surfaces of the cassette can be gripped by fingers, and a second recess which is formed in the housing so that the fingers are insertable into the housing when the cassette holder is located at the cassette eject position.

DETAILED DESCRIPTION OF THE PREFERRED EMBODIMENT

Figure 1:
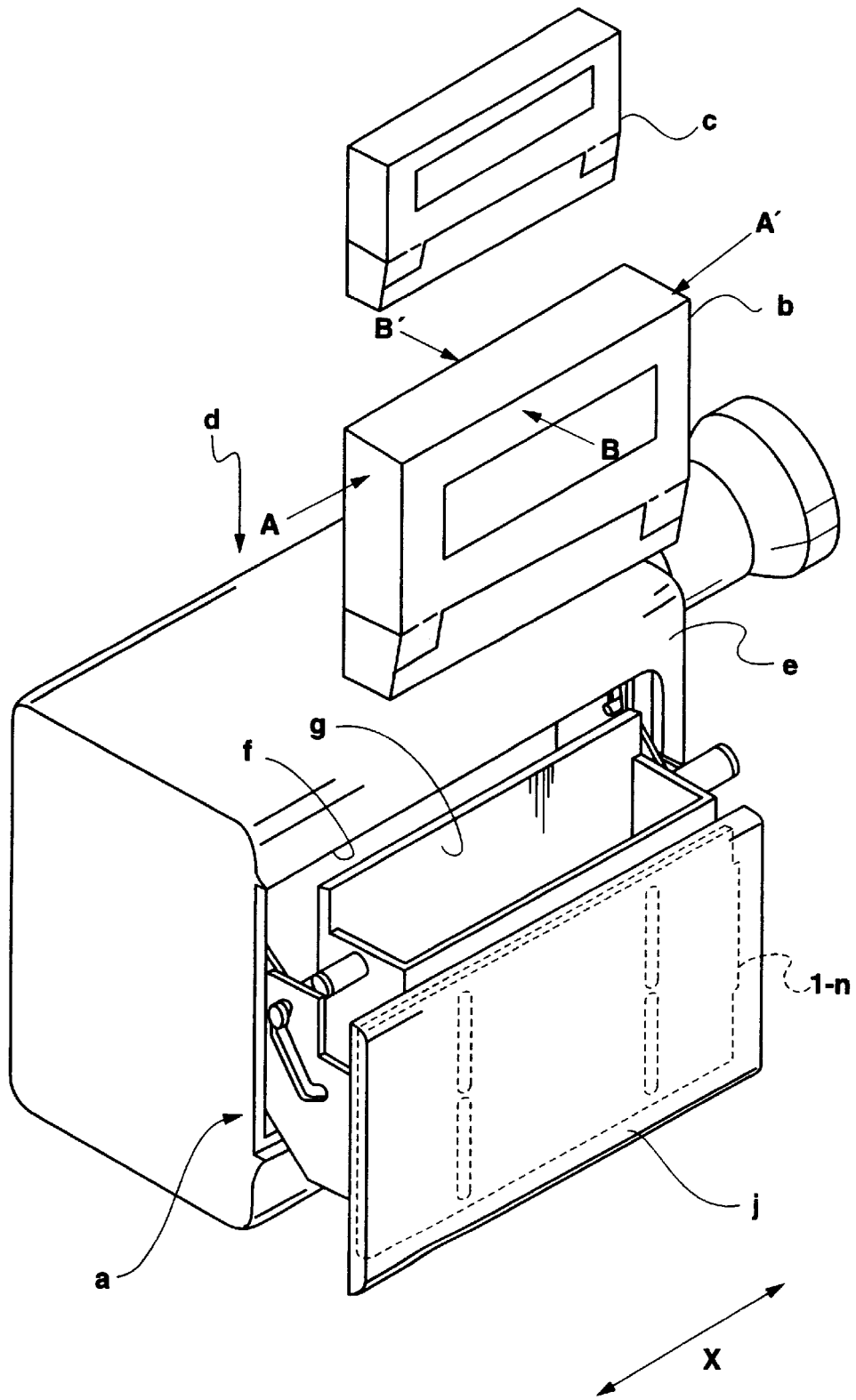
FIG. 1 is a perspective view showing a conventional cassette mounting and ejection mechanism when a cassette holder is located at an eject position.
Figure 2:
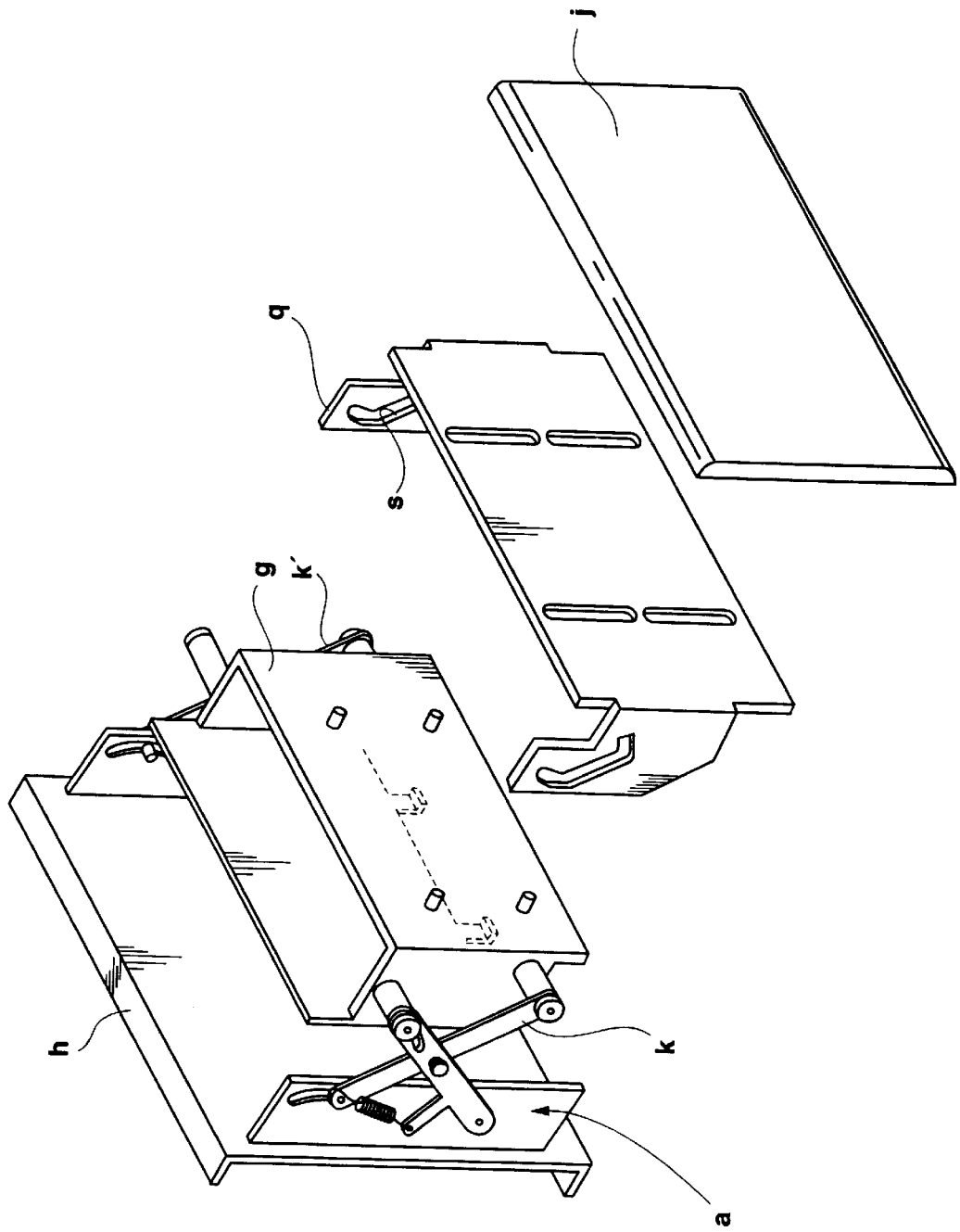
FIG. 2 is an exploded perspective view showing the cassette mounting and ejection mechanism in FIG. 1 in which a cassette holder and a lid member are illustrated as being separated from each other.
Figure 3:
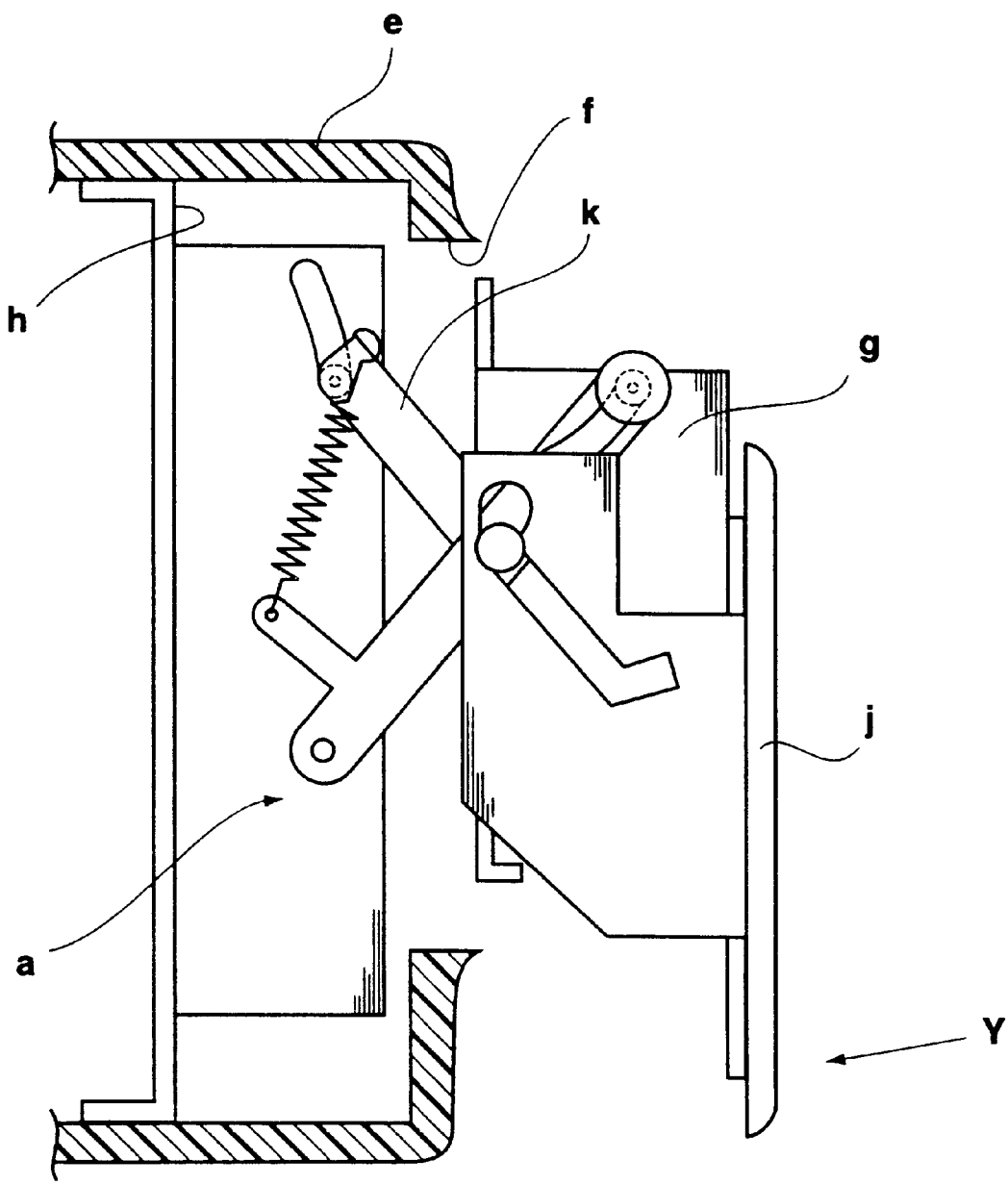
FIG. 3 is a side view showing link mechanisms of the cassette mounting and ejection mechanism in FIG. 1 when the cassette holder is located at the eject position, in which a part of the housing is partially cut out.

A preferred embodiment according to the cassette mounting and ejection mechanism of the present invention will be described with reference to the accompanying drawings.
First Embodiment FIGS. 4 to 8 show a first embodiment of a pop-up type cassette mounting and ejection mechanism 1.

The cassette mounting and ejection mechanism 1 has a cassette holder 5 which is movable between a cassette mount position in a housing of a video camera 2 and an eject position out of the housing 3, a pantograph type link mechanisms 7 through which the cassette holder 5 is mounted to a mechanical chassis provided in the housing 3, a lid member 8 for closing the cassette inserting/taking-out opening 4 when the cassette holder 5 is located at the cassette mount position, and an reinforcing member 9 for linking the lid member 8 and the housing 3.

Figure 4:
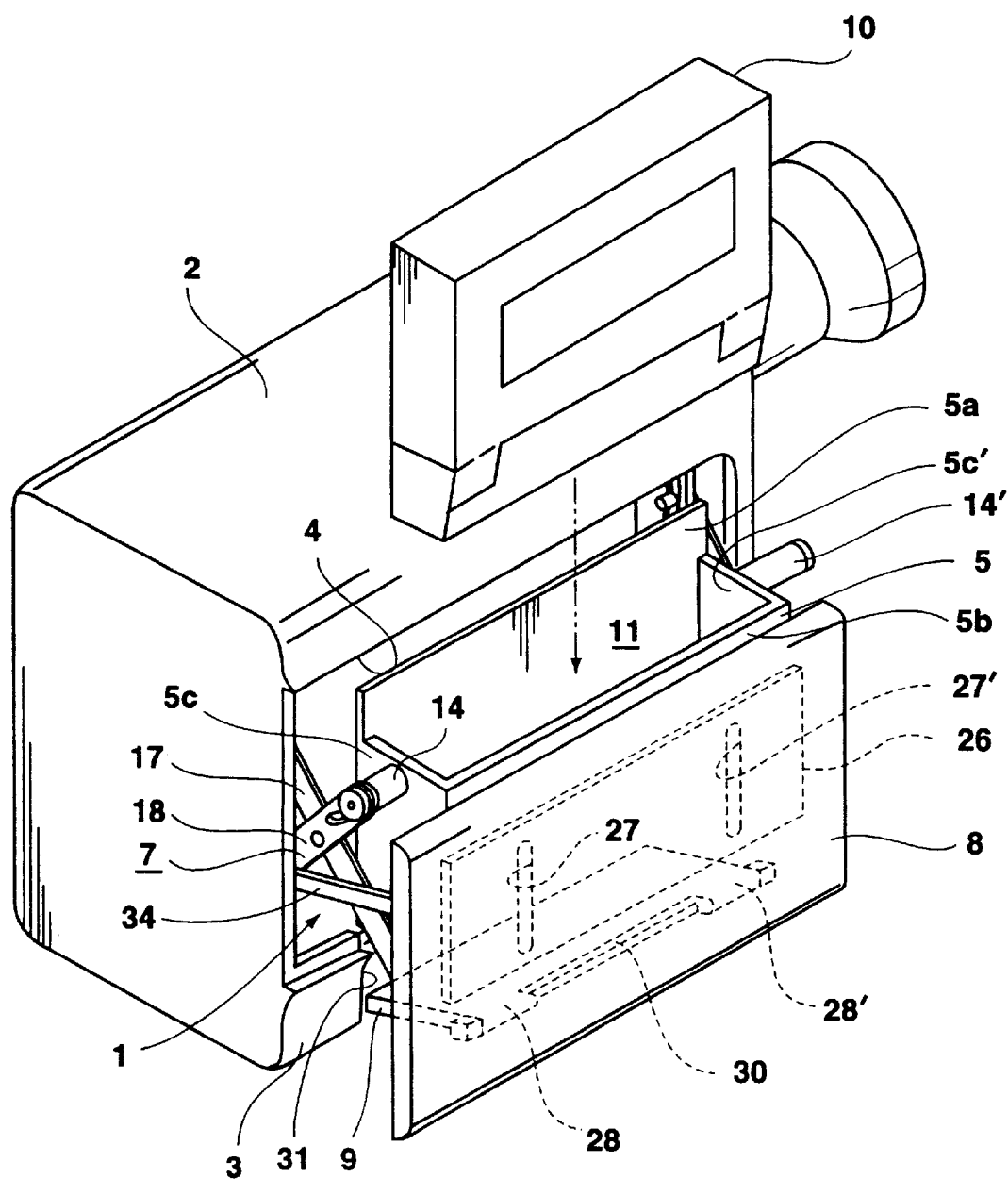
FIG. 4 is a perspective view showing an embodiment of the present invention in which the cassette mounting and ejection mechanism of the present invention is applied to a video camera.
Figure 5:
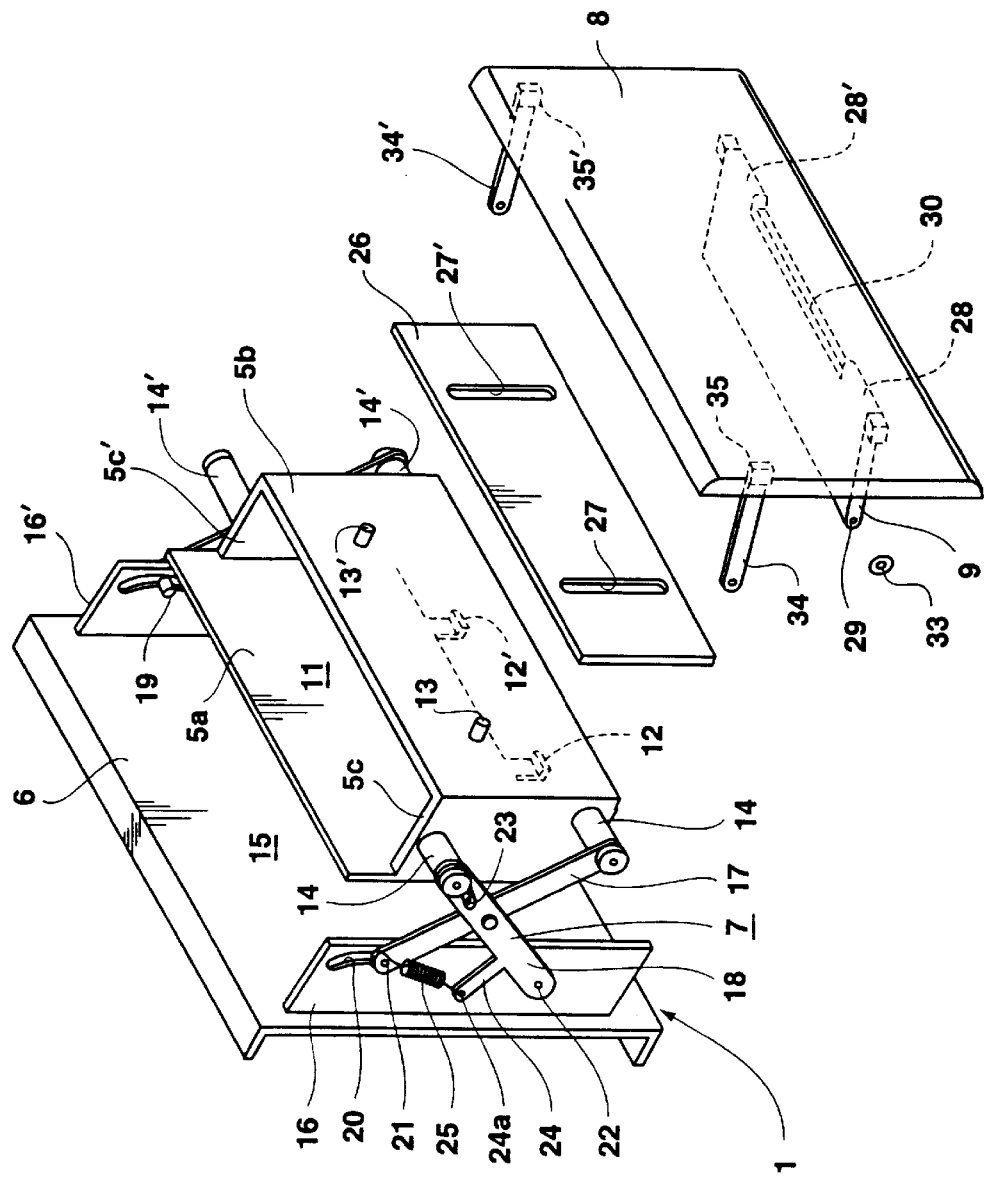
FIG. 5 is an exploded perspective view showing the video camera shown in FIG. 4 when a cassette holder and a lid member are separated from each other.
Figure 6:
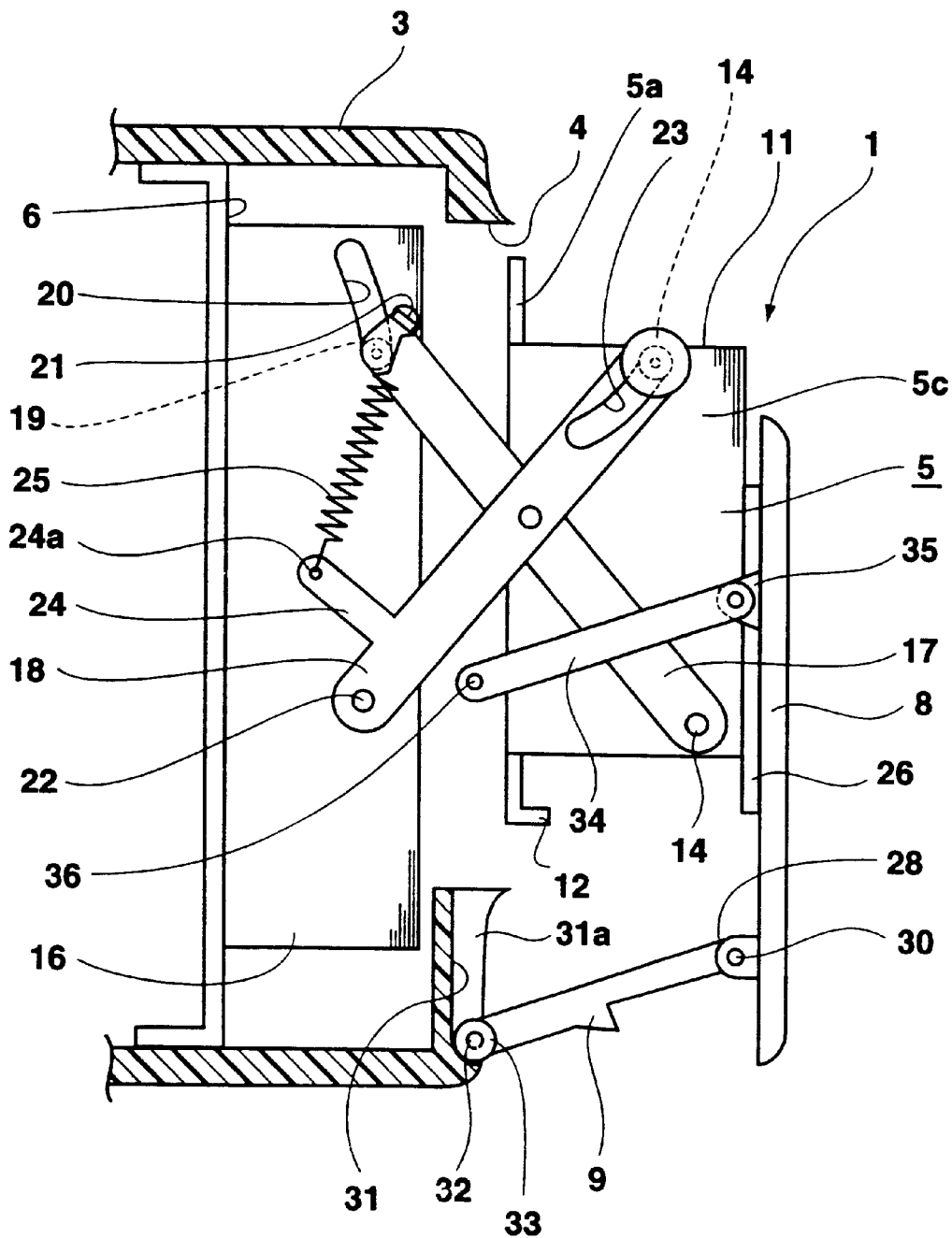
FIG. 6 is a partially cutaway cross-sectional view showing a state where the cassette holder is ejected.
Figure 7:
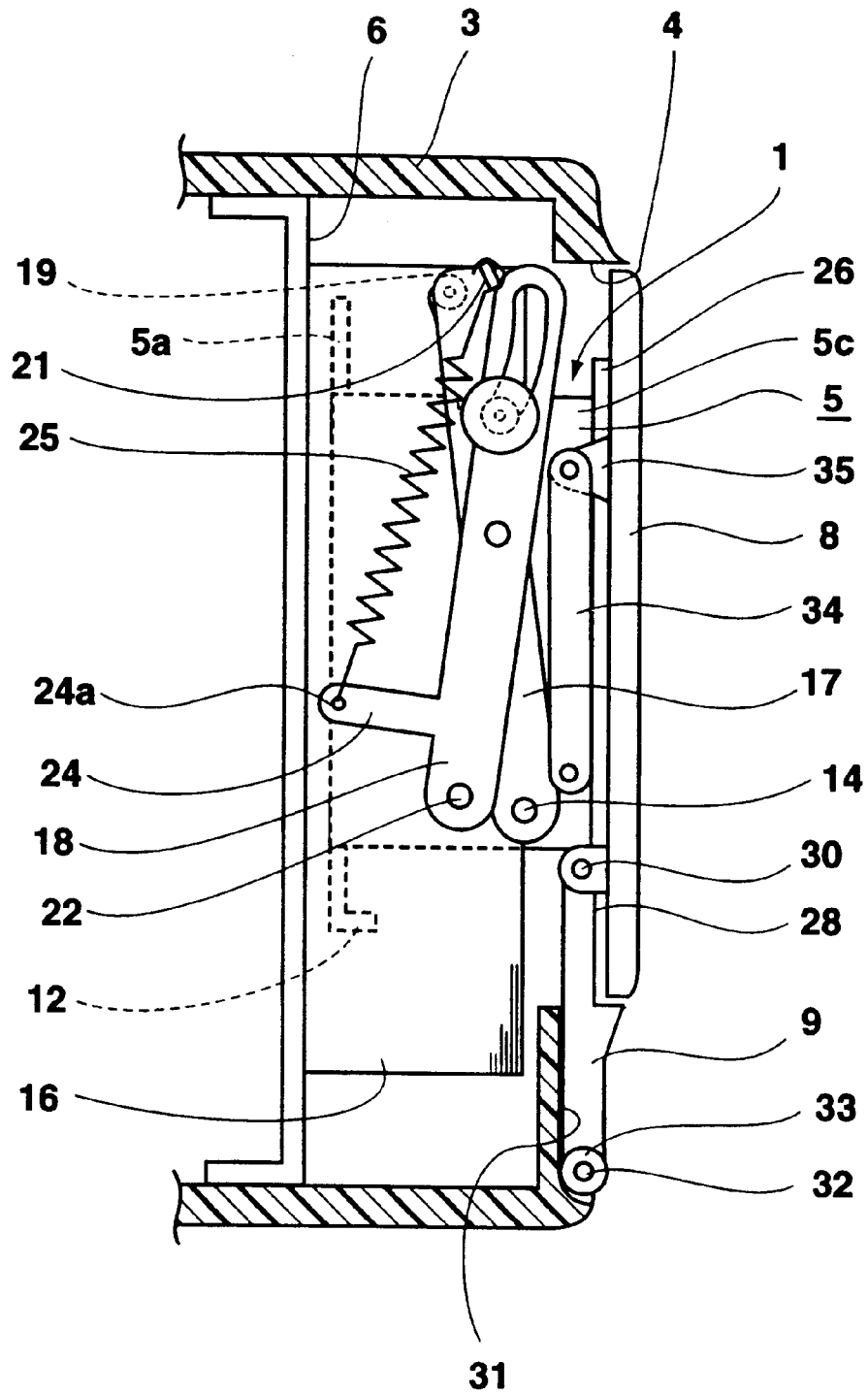
FIG. 7 is a cross-sectional view showing a state where the cassette holder is shifted from the state of FIG. 6 to a cassette mount position.
Figure 8:
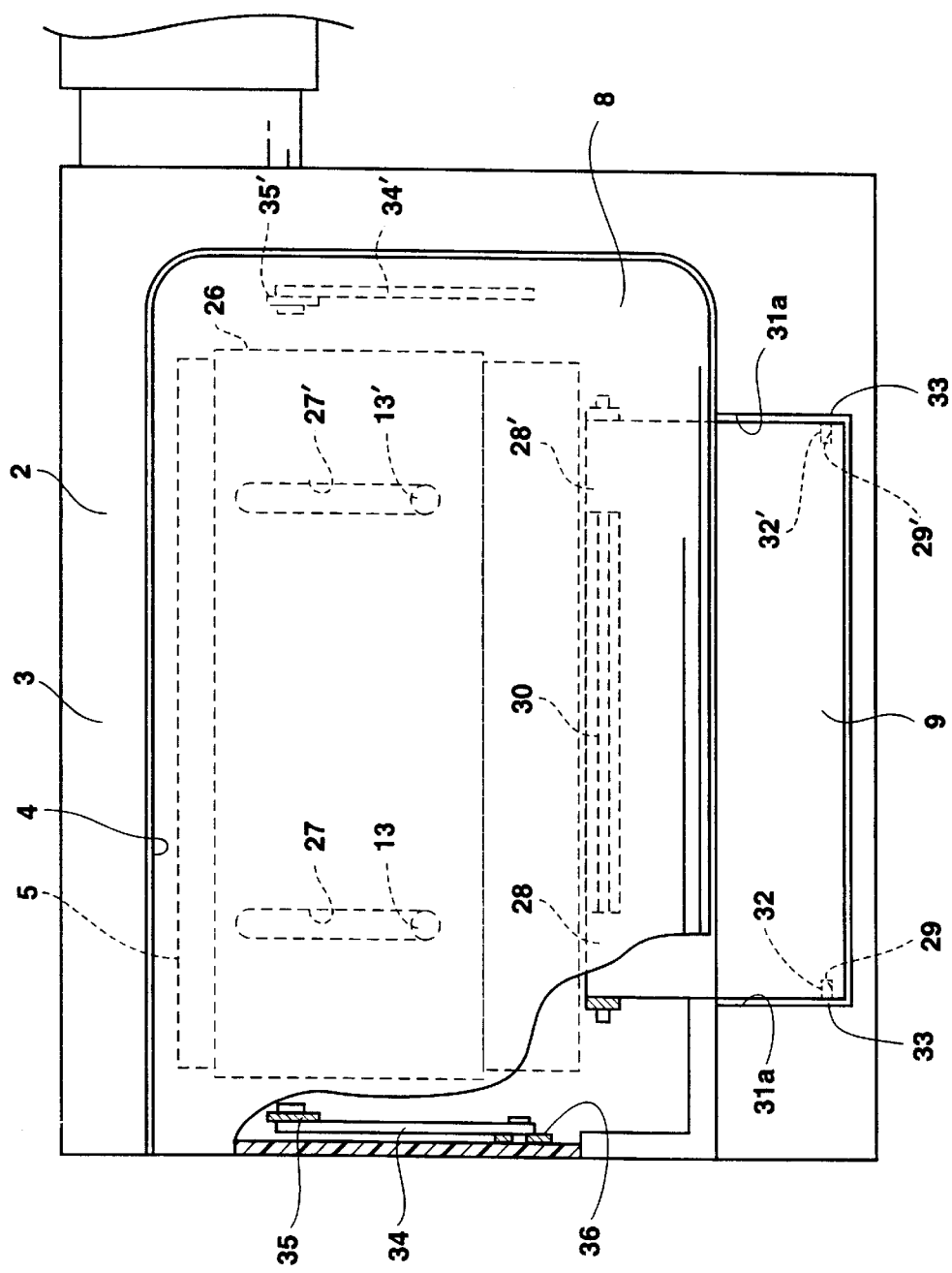
FIG. 8 is a front view showing the lid when the cassette is mounted.

In FIG. 4, the direction extending upwardly is assumed as an upper side and the direction extending downwardly is assumed as a lower side. Further, in FIG. 4, the direction extending slantly downwardly to the right is assumed as a front side, and the direction extending slantly upwardly to the left is assumed as a rear side. In the following description, the position of any element is represented on the basis of the directions (locations) defined as described above.

The cassette holder 5 is designed like a frame to have an inner space whose dimension is somewhat larger than the cassette 10, and the opening at the upper side of the cassette holder 5 serves as a cassette insertion port 11 through which the cassette 10 is inserted/taken-out. The lower end edge of an inner plate 5a of the cassette holder 5 is provided with stopper pieces 12 and 12' so that the cassette 10 inserted through the cassette insertion port 11 is prevented from falling out of the opposite side to the cassette insertion port 11.

Lid member support pins 13 and 13' are disposed away from each other in the right and left direction on an outer plate 5b of the cassette holder 5 so as to project forwardly. Further, link support pins 14 and 14' are disposed away from each other in the upward and downward direction on the right and left side plates 5c and 5c' of the cassette holder 5 so as to project outwardly.

A space 15 having the mechanical chassis 6 as a base is served as a cassette mount portion of the housing 3 on and from which the cassette 10 is freely mounted and ejected, and the mechanical chassis 6 is provided with a cassette positioning pin, a tape guide, a reel stand, etc. (not shown). Further, side wall plates 16 and 16' are forwardly projectingly provided on the right and left side portions of the mechanical chassis 6 so as to be away from each other at an interval which is somewhat larger than the width of the cassette holder 5.

Each link mechanism 7 comprises a first link 17 and a second link 18 which is linked to the first link 17 so that the first and second links 17 are freely rotatable at the center portions thereof. These link mechanisms 7 are disposed at the outside of the side wall plates 16 and 16'.

The first link 17 is rotatably supported at the lower portion thereof by a link support pin 14 which is projectingly provided at the lower side on the side plate 5c of the cassette holder 5, and a guide pin 19 is provided to the upper end portion of the first link 17 so as to project inwardly. The guide pin 19 is engagedly inserted in an arcuate guide groove 20 formed at the upper end portion of the side wall plate 16 so as to be freely slidable along the guide groove 20, but so as to be prevented from falling out of the guide groove 20. Further, a spring hook projection 21 which projects to the left side is integrally formed at the upper end portion of the first link 17 at the left side, for example.

A support pin 22 which projects inwardly is provided at the lower end portion of the second link 18. The support pin 22 is freely rotatably supported at the lower end portion of the side wall plate 16. Further, an arcuate guide groove 20 is formed at the upper end portion of the second link 18. The link support pin 14 at the upper portion of the side plate 5c is engagedly inserted in the guide groove 20 so as to be freely rotatable along the guide groove 20, but so as to be prevented from falling out of the guide groove 20. A spring hook piece 24 which projects rearwardly is integrally formed at the lower end portion of the second link 18 at the side where the spring hook projection 21 is formed on the first link 17.

According to the link mechanism 7 as described above, the first link 17 is rotatable around the lower end portion of the cassette holder 5, and the second link 18 is rotatable around the lower end portion of the side wall plate 16. In addition, the upper end portions of the first and second links 17 and 18 are swingable along the guide grooves 20 and 23, whereby the cassette holder 5 is moved in the forward and rearward direction (a direction in which the cassette is ejected from and mounted on the housing 3) while keeping the cassette holder 5 in a substantially parallel position to the mechanical chassis 6. This movement operation of the cassette holder 5 is referred to as "cassette mounting and ejection operation", and the direction of the movement is referred to as "cassette mounting and ejection direction".

The movement amount of the cassette holder 5 in the forward and rearward direction is restricted depending on the length of the guide grooves 20 and 23, so that the cassette holder 5 is movable between the cassette mount position at which the whole cassette holder 5 is accommodated in the housing 3 and the eject position where the cassette holder 5 is ejected frontwardly from the front surface of the housing 3.

In the link mechanism 7 at the left side, a tension spring 25 is suspended between the spring hook projection 21 of the first link 17 and a spring hook hole 24a formed at the tip of the spring hook piece 24 of the second link 18 to urge the first link 17 and the second link 18 so that the upper end portion of the first link 17 and the lower end portion of the second link 18 approach each other, that is, the lower end of the first link 17 and the upper end of the second link 18 are urged forwardly (in the direction where the cassette holder 5 is ejected) at all times.

When the cassette holder 5 is located at the cassette mount position, the location of the cassette holder 5 is kept by lock means (not shown). The lock of the lock means is released by operating an eject button (not shown).

The housing 8 is supported through a slide plate 26 on the outer plate 5b of the cassette holder 5 so as to be freely slidable upwardly and downwardly. The slide plate 26 is designed to be smaller in size than the housing 8, and elongated holes 27 and 27' extending in the upward and downward direction are formed at the positions corresponding to the lid member support pins 13 and 13' in the slide plate 26. The lid member support pins 13 and 13' are respectively inserted in the corresponding elongated holes 27, 27' while prevented of falling out of the elongated holes 27, 27'. The lid member 8 is screwed to the slide plate 26, so that the lid member 8 is supported on the cassette holder 5 so as to be freely slidable upwardly and downwardly relatively to the cassette holder 5.

The reinforcing member 9 is formed of a plate member which extends in the right and left direction and has a width in the upward and downward direction which is somewhat larger than the thickness of the cassette holder 5 in the forward and rearward direction. The reinforcing member 9 is rotatably supported by the lid 8 so as to be freely movable between a position which is slightly upwardly shifted from the lower end edge of the back surface of the lid member 8 and a position which is downwardly shifted from the lower side edge of the cassette inserting/taking-out opening 4 of the housing 3.

At both the right and left end portions of the upper side edge of the reinforcing member 9 are integrally formed upper-side support pieces 28 and 28' each having an upper-side support hole which penetrates in the right and left direction, and also at the lower end portions of the right and left side surfaces of the reinforcing member 9 are formed lower-side support holes 29 and 29' which are opened in the left and right directions, respectively.

Further, a support shaft 30 which extends in the right and left direction is disposed at a position which is slightly higher than the lower end edge of the back surface of the lid member 8 while being supported at both ends thereof on the back surface of the lid member 8 so as to be away from the back surface of the lid member 8 at a suitable distance. The support shaft 30 is penetrated through the upper-side support holes 28 and 28' so that the reinforcing member 9 is rotatably supported on the lid member 8.

The housing 3 is provided with a relatively shallow recess 31 which is opened forward along the lower side edge of the cassette inserting/taking-out opening 4, and support pins 32 and 32' which project into the recess 31 are provided at the lower end portions of the right and left side walls 31a of the recess 31. The support pins 32 and 32' are inserted into the lower-side support holes 29 and 29' of both the right and left end surfaces of the reinforcing member 9, whereby the reinforcing member 9 is rotatably supported on the housing 3. Further, the distance between the right and left side walls 31a is set to be slightly larger than the width of the reinforcing member 9 in the right and left direction. When the reinforcing member 9 is supported by the support pins 32 and 32', washers 33 having an excellent sliding property are interposed between the right end surface of the reinforcing member 9 and the right side wall 31a of the recess 31 and between the left end surface of the reinforcing member 9 and the left side wall 31a, whereby the reinforcing member 9 is mounted on the recess 31 with no backlash in the right and left direction, and the swing motion of the lid member 8 relative to the housing 3 can be smoothly performed.

According to the cassette mounting and ejection mechanism as described above, the reinforcing member 9 is supported at the upper and lower end edges thereof by the lid member 8 and the housing 3, respectively, and the lid member 8 and the housing 3 are linked to each other. Accordingly, when the cassette holder 5 arrives at the cassette mount position and the lid member 8 closes the cassette inserting/taking-out opening 4, the lower half portion of the reinforcing member 9 is located within the recess 31, and the outer surface thereof is located on the same plane of the outer surface of the housing 3. Further, the residual portion (upper half portion) is located inside the lid member 8 (see FIG. 7). When at the cassette mount position, the lower half portion of the reinforcing member 9 is located within the recess 31 and the upper half portion thereof is located inside the lid member 8, the housing 3, the lid member 8 and the reinforcing member 9 can constitute an outer package together. Therefore, no undesired uneven portion preventing the operation is formed, and the integrated outer package is excellent in appearance.

Further, auxiliary arms 34 and 34' formed of sheet metal material are provided between the cassette inserting/taking-out opening 4 of the housing 3 and the lid member 8 on the right and left side edges thereof to link the housing 3 and the lid member 8.

That is, the upper end portions of the auxiliary arms 34, 34' are rotatably mounted on the back surface of the lid member 8 through support projecting pieces 35, 35' formed at positions which are slightly inwardly shifted from the right and left side edge of the lid member 8 and slightly downwardly shifted from the upper end edge of the lid member 8. Further, the lower end portions of the auxiliary arms 34, 34' are rotatably secured through shafts to securing pieces 36 disposed at positions which are downwardly shifted from the center in the upward and downward direction at the right and left side edges of the cassette inserting/taking-out opening 4.

The length of the auxiliary arm 34 is substantially equal to the width of the reinforcing member 9 in the upward and downward direction, and the auxiliary arms 34, 34' are disposed to be in parallel to the reinforcing member 9 at all times if they are viewed from the right and left direction.

With this construction, the lid member 8 is upwardly/downwardly moved interlockingly with the mounting and ejecting operation of the cassette holder 5, and it can perform its stable opening/closing operation while kept in a parallel position to the surface of the housing 3.

That is, if the auxiliary arms 34 and 34' are not provided, the linkage between the lid member 8 and the housing 3 is performed at only the lower portions thereof by the reinforcing member 9. Therefore, when the lid member 8 is manually pushed to move the cassette holder 5 to the cassette mount position, the upper end portion of the lid member 8 is more forwardly displaced than the lower end portion of the lid member 8, and thus the parallel relationship between the lid member 8 and the surface of the housing 3 is lost. Therefore, friction occurs during the sliding motion of the slide plate 26 to the cassette holder 5, so that the sliding motion is disturbed.

On the other hand, if the auxiliary arms 34 and 34' are provided, the housing 8 is kept in parallel to the housing 3 at all times by the auxiliary arms 34 and 34' and the reinforcing member 9. Therefore, the interval between the cassette holder 5 and the slide plate 26 can be kept at a fixed value, so that excessive friction due to uneven load does not occur in the sliding motion. Therefore, the stable opening/closing operation of the lid member 8 is stabilized in being supported by the reinforcing member 9 and the auxiliary arm 34.

When the cassette 10 is mounted in the video camera 2, the cassette holder 5 is drawn out to the eject position. At this time, the lock of the lock means (not shown) is released by manipulating the eject button, and the cassette holder 5 is moved to the eject position by the elastic force of the tension spring 25.

When the external force is applied to the cassette holder 5 in a direction other than the cassette mounting direction in a state where the cassette holder 5 is located at the eject position, if the external force is great and acts in the right and left direction, the external force is received by such a sturdy structure that the right and left side edges of the reinforcing member 9 incur the external force at the right and left side walls 31a, through the washers 33. In addition, the reinforcing member provides a higher mechanical strength because the reinforcing member 9 is formed of a plate member which is longer in the right and left directions.

Subsequently, the cassette 10 is inserted into the cassette holder 5 from the upper side, the cassette holder 5 is manually pushed into the housing 3, and then the cassette holder 5 is moved to the cassette mount position.

At this time, even when the lid member 8 is manually pushed strongly to have the cassette holder 5 moved to the cassette mount position with the lid member 8 being slid, the external force is received by the reinforcing member 9, and thus the cassette holder 5, the link mechanisms 7, the mechanical chassis 6 and the lid member are hardly deformed or damaged.

Further, when the cassette 10 is taken out from the video camera 2, the lock of the lock means is released by manipulating the eject button (not shown), and the cassette holder 5 is ejected to the front surface side of the housing 3 by resilient force of the tension spring 25 to move the cassette holder 5 to the eject position.

In the embodiment as described above, the reinforcing member 9 is formed of the plate member which is longer in the right and left direction. However, the present invention is not limited to the above embodiment, and in place of the plate member, two arm members each of which is formed of material having relatively high rigidity may be provided to be away from each other in the right and left direction.

Second Embodiment

A second embodiment according to the present invention will be described in detail with reference to FIGS. 9 to 12.

A housing (case) 132 of a cassette mounting and ejection mechanism 131 of this embodiment has an opening portion. A cassette holder for accommodating a cassette has a cassette inserting/taking-out opening at one end thereof, and it is reciprocatively movable through the opening of the housing 132 between a cassette mount position in the housing 132 and a cassette eject position out of the housing 132. In synchronism with the reciprocative movement of the cassette holder, a lid member 136 is slid to the cassette inserting/taking-out side when the cassette holder is moved to the eject position.

The housing 132 and the lid member 136 are formed of synthetic resin or the like, and the lid member 136 has a sufficiently larger area than the projection area of the cassette holder 134 so that an opening 133 of the housing 132 is closed by the lid member 136. The lid member 136 are secured to the side surface of a slid plate 141 by two vises, and the slide plate 141 and the whole side surface of the cassette holder 134 are covered by the lid member 136.

A recess 137 is formed at the center portion of the upper edge side of the opening 133 having a substantially rectangular shape which is formed in the housing 132, and a projection 138 for opening/closing the recess 137 is integrally formed at the center portion of the upper edge side of the lid member 136. The projection 138 is designed to be substantially vertical to a bottom plate 134a of a cassette holder 134, and a cassette insertion space 151 is formed between the bottom plate 134a and the projection 138.

A center cutout 153 is formed at the center portion of the upper edge side of the bottom plate 134a so as to confront the recess 137. A pair of right and left cassette stoppers 154 are integrally formed at both the right and left end portions of the lower edge side of the bottom plate 134a to line up a front end 111a of a large-size cassette 111 and the center in the right and left direction of the cassette 111 with a mechanical deck 121.

Further, a pair of right and left pantographs are used as a pop-up mechanism 161 serving as a driving means for the cassette holder which is reciprocatively moved between the cassette mount position in the housing 132 and the cassette eject position out of the housing 132 in the directions as indicated by arrows c and d.

Next, the inserting/taking-out operation of the large-size cassette 111 will be described.

Figure 9B:
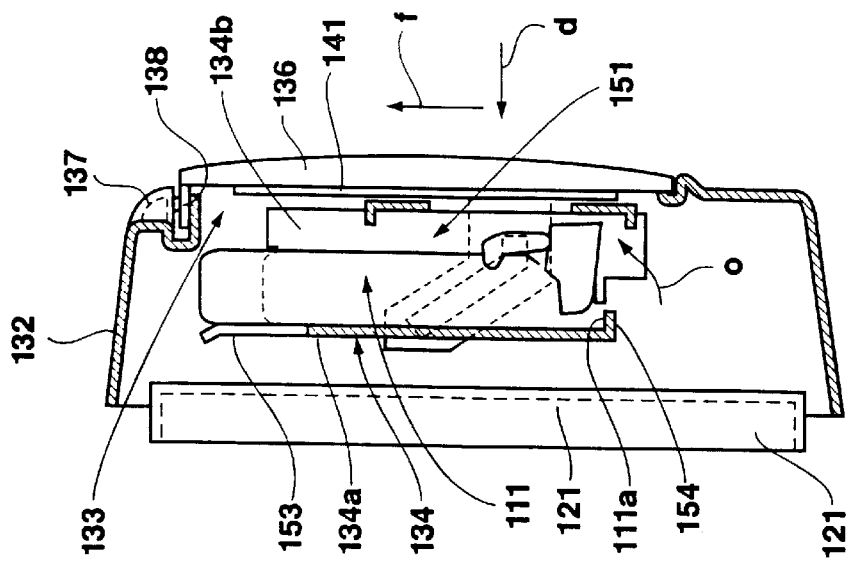
FIGS. 9A and 9B are cross-sectional and side views showing a mounting and ejection operation of a large-size tape cassette.
Figure 9A:
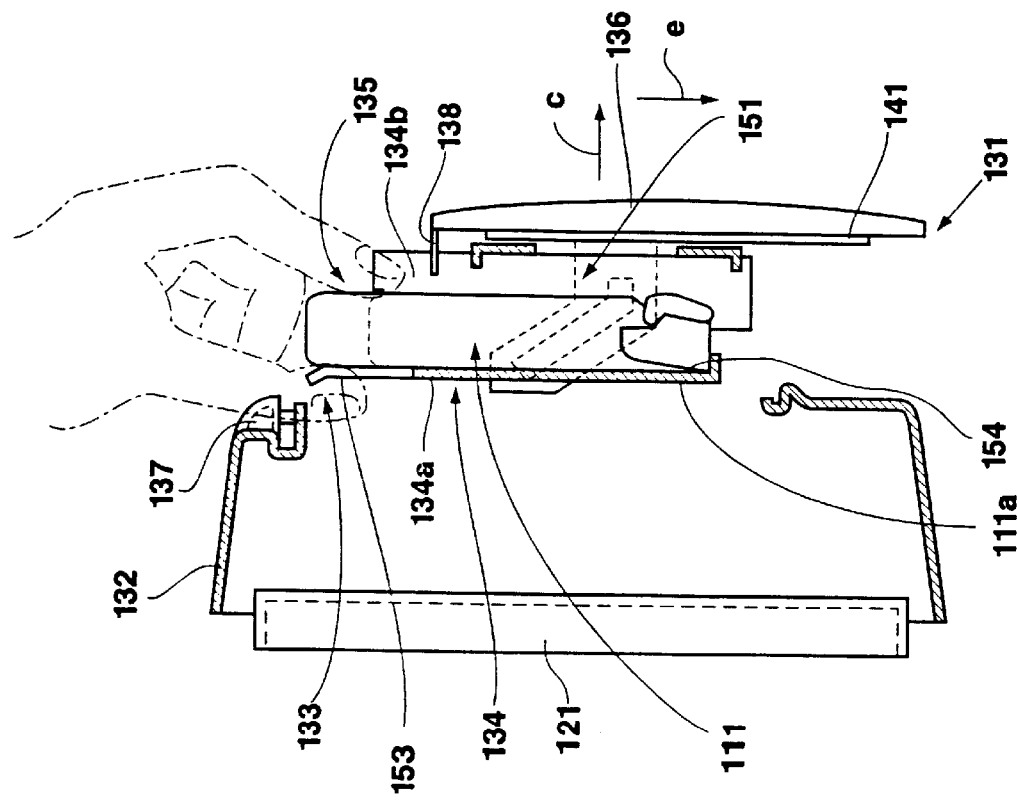

Before the cassette is loaded, the cassette holder 134 is moved through the opening 133 to the eject position out of the housing 132 in the direction as indicated by the arrow c as shown in FIG. 9A, and the lid member 136 is slid in the direction as indicated by an arrow e relatively to the cassette holder 134, whereby the cassette inserting/taking-out opening 135 of the cassette holder 34 is opened.

When the cassette is loaded into the cassette holder, as shown in FIGS. 9A, 10A, 11A and 11B, the large-size cassette 111 is vertically inserted into the cassette insertion space 151 of the cassette holder 134 in the direction as indicated by the arrow e with the front end 111a of the tape cassette being placed face down to thereby insert the large-size tape cassette into the gap between both the right and left side plates 134b. At this time, the front end 111a of the cassette 111 abuts against the pair of right and left cassette stoppers 154 while a cassette press member 101 presses the large-size cassette 111 on the bottom plate 134a in parallel, and is finally stopped.

Figure 10B:
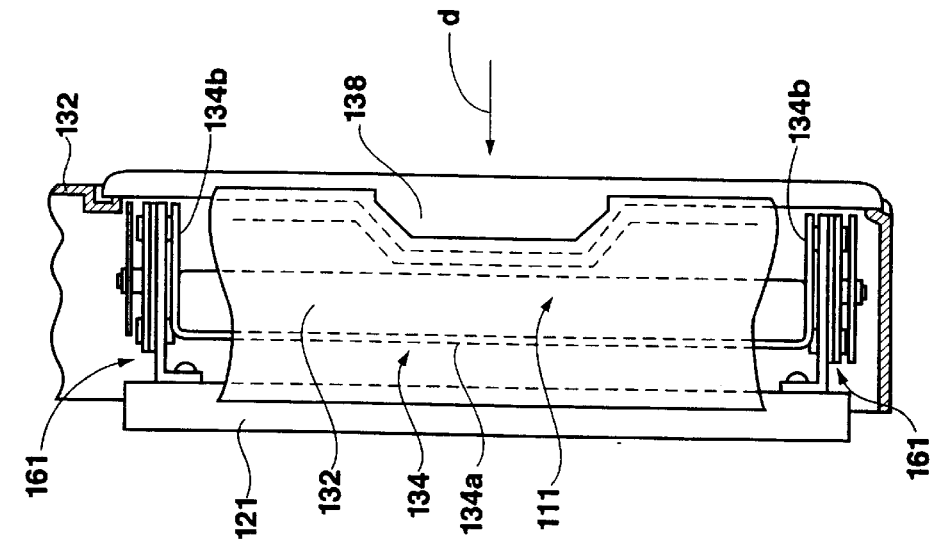
FIGS. 10A and 10B are partially cutaway plan views showing the mounting and ejection operation of a large-size tape cassette.
Figure 10A:
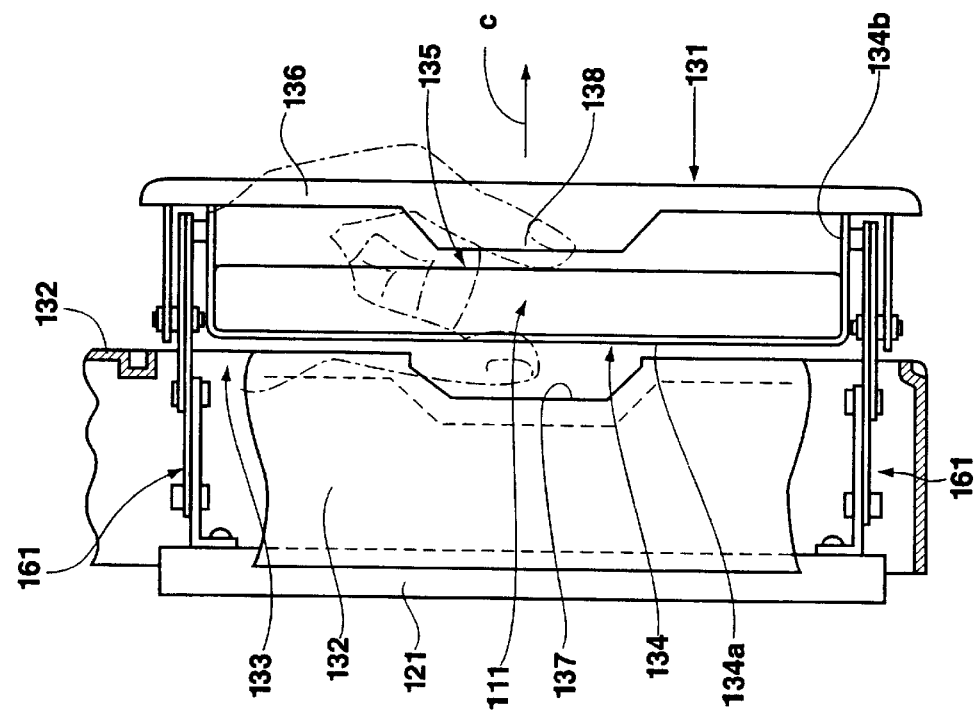
Figure 11A:
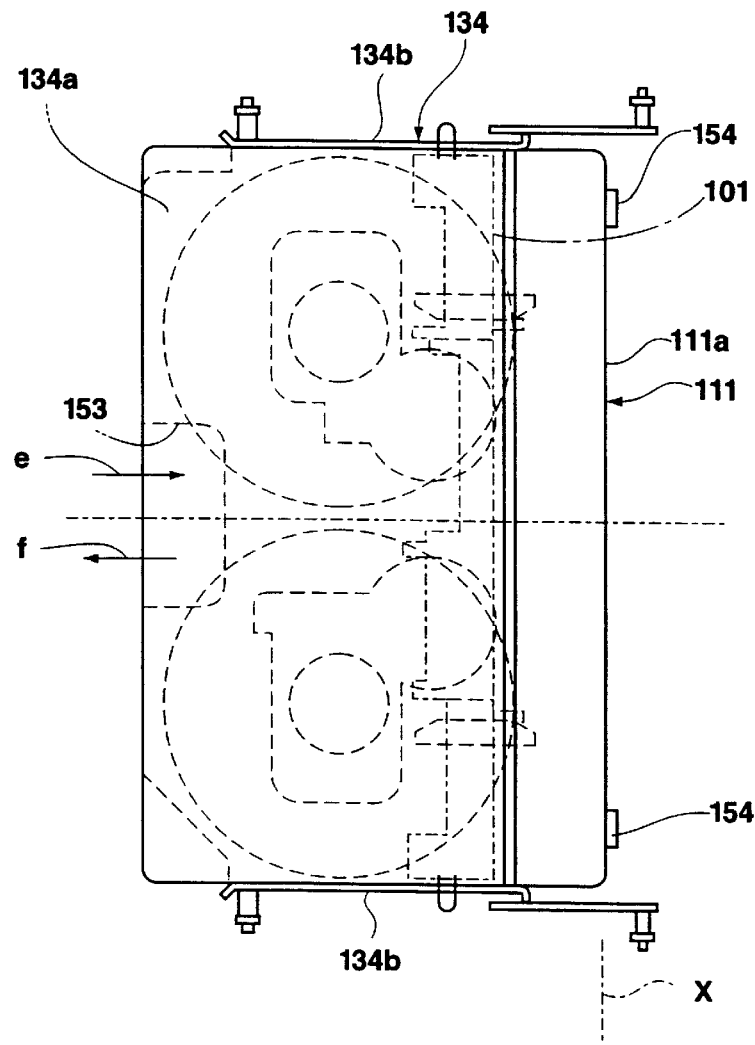
FIGS. 11A and 11B are a plan view and a partially cutaway side view showing the positioning operation of a large-size tape cassette in a cassette holder, respectively.
Figure 11B:
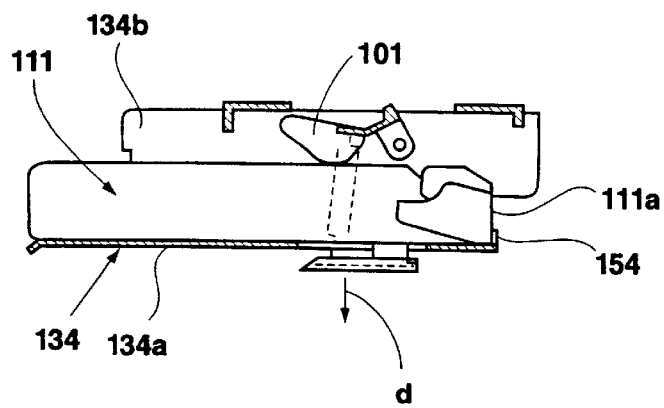
Figure 12A:
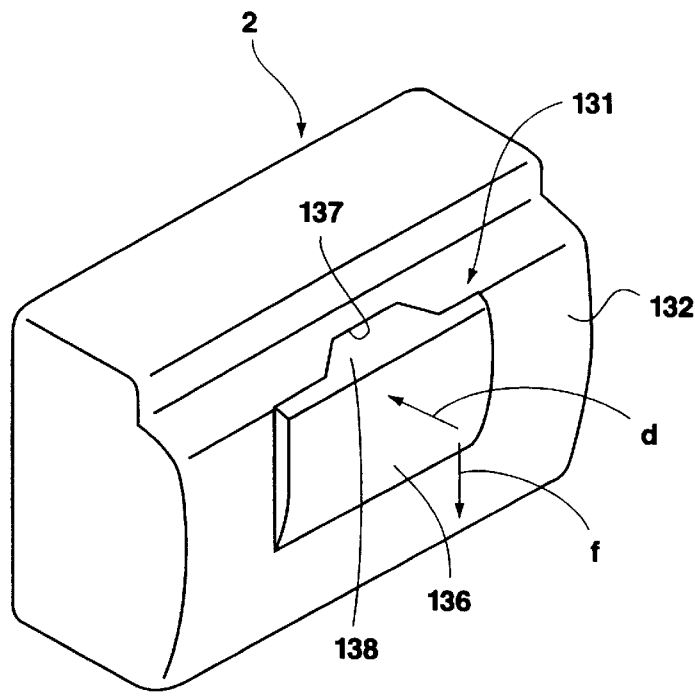
FIGS. 12A and 12B are schematic perspective views showing the movement of the cassette holder and the lid.
Figure 12B:
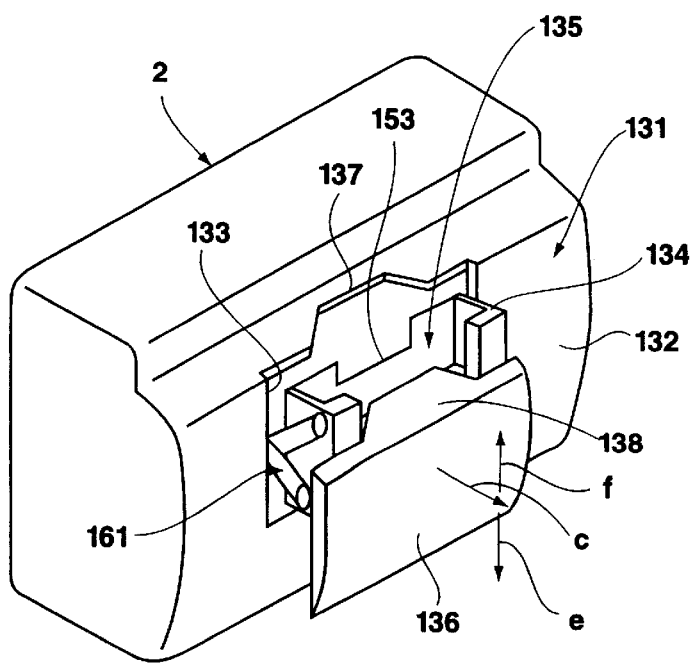

Through the sliding motion of the lid member 136 in the direction of the arrow e relatively to the cassette holder 134, the cassette inserting/taking-out opening 135 is opened, and the projection 138 of the lid member 136 is displaced in the direction of the arrow e relatively to the recess 137. Accordingly, when the cassette is loaded into the cassette holder, the center portions of both the side surfaces in the longitudinal direction of the large-size cassette 111 is gripped from the both sides thereof with the thumb and the forefinger as shown in FIG. 10A. In this case, the thumb and the forefinger can be easily inserted into the cassette holder 134 by using the recess 137 of the housing 132 and the center cutout 153 of the bottom plate 134a of the cassette holder 134. Accordingly, the insertion work of the large-size cassette 111 into the cassette holder 134 can be easily performed.

When the cassette is ejected, as shown in FIG. 9A and FIG. 9B, the cassette holder 134 is slowly and quietly popped up through the opening 133 to the eject position out of the housing 132 in the direction of the arrow c. In addition, the lid member 136 is slid in the direction of the arrow e relatively to the cassette holder 134 to open the cassette inserting/taking-out opening 35 of the cassette holder 134.

Subsequently, the thumb and the forefinger are easily inserted into the cassette holder 134 in the direction of the arrow e by utilizing the recess 137 of the housing 132 and the center cutout 153 of the bottom plate 134a, and then both the side surfaces in the longitudinal direction of the large-size cassette 111 are gripped with the thumb and the forefinger to easily pull out the large-size cassette 111 from the cassette holder 134 in the direction as indicated by an arrow f.

As is apparent from the foregoing description, according to the cassette mounting and ejection mechanism comprising the housing which has a cassette inserting/taking-out opening, the cassette holder which supports the cassette and is movable through the cassette inserting/taking-out opening between the cassette mount position in the housing and the cassette eject position out of the housing, and a lid member which closes the cassette inserting/taking-out opening of the housing when the cassette holder is located at the cassette mount position and is moved away from the housing interlockingly with the movement of the cassette holder to the eject position to thereby open the cassette inserting/taking-out opening, the reinforcing member which is mounted on the housing at one end thereof and also mounted on the lid member at the other end thereof is further provided to link the housing and the lid member therethrough. Therefore, even when external force is applied to the lid member in a direction other than the cassette inserting/taking-out direction, the external force can be dispersed to not only the cassette holder, but also to the housing. Therefore, as compared with the conventional pop-up type cassette mounting and ejection mechanism, the mechanical strength is increased.

Further, in the cassette mounting and ejection mechanism as described above, the lid member is slidably mounted on the cassette holder, and the sliding direction is set to be in parallel to the cassette insertion direction into the cassette holder. The reinforcing member is formed of a plate which is long in the width direction of the cassette. One of the two side edges of the reinforcing member which extend in the longitudinal direction is rotatably mounted on the lid member, and the other side edge is rotatably mounted on the housing. Therefore, the cassette mounting and ejection mechanism having high mechanical strength can be constructed with a relatively simple construction. In addition, when the cassette inserting/taking-out opening is opened, the lid member is movable downwardly relatively to the cassette holder, so that the inserting/taking-out operation of the cassette into/from the cassette holder can be facilitated.

Still further, in the cassette mounting and ejection mechanism as described above, at the cassette inserting/taking-out opening side of the cassette holder, the recess is formed in the housing and the projection for closing the recess is formed in the lid member. This construction further facilitates the insertion of the fingers into the housing from the cassette inserting/taking-out opening in combination of the displacement of the lid member from the cassette inserting/taking-out opening in the cassette insertion direction when the cassette holder is pushed out to the cassette eject position out of the housing. Accordingly, the inserting/taking-out operation of the cassette into/from the cassette holder can be further facilitated.

In addition, since there is formed only a space required for the insertion of the fingers as the cassette inserting/taking-out opening, the cassette can be prevented from being erroneously inserted into the cassette holder or undesired materials (foreign materials) can be prevented from being contaminated into the cassette holder. At the same time, dirt such as dust or the like can be prevented from invading into the chassis.

The embodiments as described above relates to the cases where the present invention is applied to the cassette mounting and ejection mechanism of a video camera. However, the present invention is not limited to these embodiments, but may be applied to a cassette of, for example, a cassette recording/reproducing apparatus for other recording media such as an optical disc, a magnetic disc, etc.

Further, in the above embodiments, the pop-up operation of the cassette holder is performed while the cassette holder is kept in parallel to the surface of the housing. However, the present invention is not limited to these embodiments, but is applicable, for example, to a cassette in which the protruding distance of the lower portion of the cassette holder from the surface of the housing is set to be smaller than that of the upper portion of the cassette holder. That is, the present invention may be applied to any type cassette mounting and ejection mechanism insofar as the cassette holder is moved outwardly from the surface of the housing.

The present invention is not limited to the shape and construction of each part of the above-described embodiments, and various modifications may be made without departing from the subject matter of the present invention. Accordingly, the subject matter of the present invention is not interpreted as being limited to the above-described embodiments.

What is claimed is:

1. In a cassette mounting and ejection mechanism comprising a housing provided with an outer surface and which has a cassette inserting/removing opening and a relatively shallow recess which is opened forwardly along a lower side edge of said cassette inserting/removing opening, a cassette holder which supports a cassette and is movable through said cassette inserting/removing opening between a cassette mount position in said housing and a cassette eject position out of said housing, and a lid member which closes said cassette inserting/removing opening of said housing when said cassette holder is located at said cassette mount position and is moved away from said housing interlockingly with the movement of said cassette holder to said cassette eject position to thereby open said cassette inserting/removing opening, the improvement comprising a reinforcing member having an outer surface and opposing ends, said reinforcing member linking said housing and said lid member with one end thereof being mounted on said housing and the other end thereof being mounted on said lid member, wherein when said cassette holder is moved to the cassette mount position and said lid member closes the cassette inserting/removal opening, a lower portion of said reinforcing member is located within said recess and in the same plane as the lid member, an upper portion of the reinforcing member being located within said lid member and the outer surface of the reinforcing member positioned flush with the outer surface of the housing.

2. The cassette mounting and ejection mechanism as claimed in claim 1, wherein said reinforcing member comprises a plate-shaped member with one side edge thereof being rotatably mounted on said lid member while the other side edge confronting said one side edge being rotatably mounted on said housing.

3. The cassette mounting and ejection mechanism as claimed in claim 2, wherein said housing has a recess for accommodating said reinforcing member when said cassette holder is located at the cassette mount position.

4. The cassette mounting and ejection mechanism as claimed in claim 2, wherein when said cassette holder is moved to the cassette mount position, said reinforcing member, said lid member, and said housing form an outer package together.

5. The cassette mounting and ejection mechanism as claimed in claim 2, further comprising an auxiliary arm linking said lid member and said housing with one end thereof being rotatably mounted on said housing and the other end thereof being rotatably mounted on said lid member, said lid member being slidably supported by said cassette holder, and said auxiliary arm being rotated for carrying out sliding motion of said lid member to said cassette holder interlockingly with the movement of said cassette holder between said cassette mount position and said cassette eject position.

6. The cassette mounting and ejection mechanism as claimed in claim 5, wherein said auxiliary arm is actuated so that the sliding direction of said lid member is substantially parallel to a direction to which said cassette is inserted into said cassette holder.

7. The cassette mounting and ejection mechanism as claimed in claim 5, wherein said auxiliary arm is provided at each of both sides of said cassette holder.

8. The cassette mounting and ejection mechanism as claimed in claim 1, wherein said reinforcing member comprises a plurality of arm members which are disposed away from one another in the right and left direction with one end of each arm member being rotatably mounted on said lid member and the other end thereof being rotatably mounted on said housing.

* * * * *